United States Patent [19]
Goddard et al.

[11] 3,932,948
[45] Jan. 20, 1976

[54] AUDIO-VISUAL LEARNING SYSTEM

[75] Inventors: Murray C. Goddard; Ray S. Kicklighter, both of Rochester, N.Y.

[73] Assignee: Eastman Kodak Company, Rochester, N.Y.

[22] Filed: Apr. 18, 1973

[21] Appl. No.: 352,859

[52] U.S. Cl. .................................. 35/9 A; 35/8 A
[51] Int. Cl.² ........................................ G09B 7/08
[58] Field of Search .......... 35/6, 8 R, 8 A, 9 R, 9 A, 35/9 B, 12 N, 35 C, 25, 42.5, 48 R, 60; 178/7.3 D, 7.5 D, DIG. 35; 360/90–94

[56] References Cited
UNITED STATES PATENTS

| | | | |
|---|---|---|---|
| 3,162,959 | 12/1964 | Woolman | 35/6 X |
| 3,353,280 | 11/1967 | Emde | 35/9 A |
| 3,395,464 | 8/1968 | Leslie et al. | 35/9 A |
| 3,404,224 | 10/1968 | Revelo et al. | 178/7.1 |
| 3,521,379 | 7/1970 | Hannah | 35/9 A |
| 3,528,181 | 9/1970 | Arbon et al. | 35/9 A |
| 3,601,532 | 8/1971 | Bitzer | 178/7.3 D |
| 3,705,271 | 12/1972 | Bell et al. | 35/35 C |
| 3,733,717 | 5/1973 | Montgomery et al. | 35/9 A |

FOREIGN PATENTS OR APPLICATIONS

| | | | |
|---|---|---|---|
| 207,044 | 1968 | U.S.S.R. | 35/12 N |

*Primary Examiner*—Richard C. Pinkham
*Assistant Examiner*—Vance Y. Hum
*Attorney, Agent, or Firm*—M. S. Sales

[57] ABSTRACT

A learning system is disclosed which can provide individualized instruction for each student. The student brings to a terminal a film record, an audio record and a tape cassette. The tape cassette includes a magnetic tape on which directions, addresses and lesson subject matter have been digitally recorded and which is related to the film record and audio record. The records and cassette are inserted by the student into their respective slot in the terminal. The lesson material is then transferred from the tape to the storage associated with a computer. The student can present queries or responses to the system which, in turn, can present queries or responses to the student. In either case, a query or response is presented as a legible manifestation on a plasma panel, a selected image derived from the film record which is projected onto the plasma panel and in superimposed relation to any manifestation and/or an aural message derived from the audio record. The student can proceed with the lesson material at a rate determined by his learning ability. The queries and response presented as manifestations are recorded on the tape in conjunction with time designations for later evaluation by the teacher.

6 Claims, 12 Drawing Figures

(INTERFACE)

(DMA)

(TAPE)

(WRITE)

(READ)

AUDIO-VISUAL LEARNING SYSTEM

FIELD OF THE INVENTION

The present invention relates to a student-controlled educational system which includes means for providing a plurality of visual displays as well as aural queries and responses related to selected lesson subject matter and, more particularly, to a learning system which is student controlled not only as to lesson subject matter but also as to the rate and manner at which the student progresses with the lesson subject matter.

DESCRIPTION OF THE PRIOR ART

A great many forms of teaching and/or game-playing machines or systems are well-known in the art which employ a moving or still picture for presentation of at least a part of the program or of the instructional material. In most instances, such machines have subject matter material so contained therein that the viewer or student has no control over its form, order or time of presentation. The simplest form of such a machine is one in which an image is presented with an aural description relating directly to the image or some part thereof. The aural presentation may be presented only once or on a repetitive basis depending on the mode of operation of the machine. In the latter case, repetition of the presentation may be under control of the viewer or student.

Another form of audio-visual teaching machine is one in which a course of instruction includes the projection of picture frames onto a viewing screen, each visual presentation being accompanied with an audio message. An item of instruction may be projected with each frame onto a designated area of the screen. The student actuates one or more buttons to designate his response to the required instruction. If the response is correct, the mode of operation of the machine is such that the machine may advance to the next frame, program or learning area. If the response is incorrect, then the mode of operation is such that the student is given additional information in order to provide him with an opportunity for making a correct response with another presentation of the same subject matter.

The learning devices which include a multiple choice format or a true or false response usually determine directly and automatically what lesson material will next be submitted to the student as a visual and/or aural presentation. As noted above, the student's response to a multiple choice question is usually made by a physical act such as actuating one of a series of selector buttons. If the response is correct, an appropriate sound recording presents the next lesson. If incorrect, the student may be backtracked in order that some of the previous presentations can be repeated before the next lesson is presented. In many instances, an audible presentation is accompanied with an associated visual presentation, but with no random selection of one relative to the other.

More sophisticated types of teaching or learning systems have been advocated in which programmed information from either or both a film and an audio record is under control of the student. However, the programmed information is in the form of a fixed number of subjects so that the student is limited in his choice. Usually, any change in the choice of subject matter requires a complete reprogramming of the system. In a system of this type, the visual and aural information is usually associated with the same film strip. As a result, a continual back and forth movement of the film is necessary in order to position the proper image in the projection station for synchronism with the related sound track. Such movement of the film strip is determined by the student's response. In addition, the visual image is usually in the form of a motion picture so it can be supplemented with an appropriate sound track.

Programmed teaching devices are generally designed to perform to a greater or lesser degree those functions normally performed by an instructor or teacher, the most basic being the presentation of instruction material with frequent or occasional interruption for testing of the student's learning. With most devices of this type, the term "programmed" merely designates an instructorless method of teaching wherein the student's rate of progress is governed by his responses to tests frequently appearing in prerecorded lesson material. There are certain forms or types of programs which are more or less related to the differences existing in the complexity of programmed teaching devices. The simplest of such program types is usually referred to as a "linear program" in which the record information is presented to the student in a fully fixed order. Each body or sequence of material is followed by questions or similar test material.

A program in which the answer given by the student alters the program to be thereafter presented is usually referred to as a "branching program". With such a mode of operation, a wrong answer shows a need by the student for some form of supplemental instruction. Such a system, therefore, requires that the medium on which the lesson material and any display related to the lesson material must be made available on both a go-ahead or reverse direction to provide a system of random access. In some cases, the use of motion picture film and an audio tape can provide the basis for such a system. However, depending on the complexity of the system, the equipment required to perform the necessary controls becomes very complex and, hence, expensive. This is particularly true in the case of the use of an audio tape because synchronized controls must be provided for joint operation even though at times only individual operation is required.

Fully satisfactory branching-program teaching using a motion picture film as the record medium can be provided if the program is recorded on a plurality of separate and independently driven films. However, to those skilled in the art it should be readily apparent that such a system presents many operational problems. One other approach has been the recording of auxilliary material between the main portions of the program with an alternate sequence recorded parallel to the program. This sequence is utilized in the event the auxilliary material is not required by the student response. In this latter case, a student who responds incorrectly is deprived of this useful, additional material. The program, therefore, presents a choice between wasting the time of the better or quicker student and omitting the presentation of useful material to the slower student.

Many of the abovementioned disadvantages of known teaching machines have been overcome by the teaching device disclosed herein. In the audio-visual learning system described hereinbelow, the record mediums and lesson subject matter are so interrelated that the system is completely under the control of the student, thereby permitting the student to choose not only the lesson subject matter but the rate at which he desires to proceed.

SUMMARY OF THE INVENTION

A primary object of the invention is to provide an audio-visual learning system in which the student introduces the lesson subject matter to the system in the form of a visual record, an audio record and a control record.

Another object of the invention is to provide an audio-visual learning system which will provide individualized interactive instruction for a single student with respect to a single course of lesson subject matter and which can also be provided at the same time to a number of students.

A further object of the invention is to provide an audio-visual learning system in which the learning rate is maximized while the student is allowed to proceed at his own rate.

Still another object of the invention is to provide an audio-visual learning system in which a number of stimulii or displays provide a full presentation of the lesson subject matter, such stimulii being in the form of one or more legible manifestations, a visual display, and an aural query or response.

Yet another object of the invention is to provide an audio-visual learning system in which a visual record, an audio record and a control record must be properly inserted and introduced by the student into a terminal associated with the system in order to make the lesson subject matter available to the student.

These and other objects and advantages of the invention will be apparent to those skilled in the art by the description which follows.

The objects and advantages of the invention as set forth hereinabove are attained by an interacting audio-visual learning system that is fully controlled by the student. The lesson subject matter comprises a visual record having a number of images, an audio record having a number of messages recorded thereon and a control record having recorded direction data and address data for the images and messages related to the lesson subject matter. These records are introduced by the student into the system comprising a terminal, data storage means, data memory means and visual display means. The visual display means includes a student-actuated keyboard which serves as an input means for alpha-numeric and graphic information into the memory means, storage means and visual display means, the latter representing the information as a legible manifestation of the query or response originating at the keyboard or as a readout from the memory means.

The visual record means is introduced into a projection system by means of a device that moves the record so as to position a selected one of the plurality of images thereon in alignment with the projection system. This image presents a visual display related to a query or response. This visual display can be projected onto a screen in a superimposed relation to the legible manifestation of the query or response, or projected onto a screen separate and distinct from the visual display means.

The audio record is inserted by the student in the terminal and then positioned relative to a transducer. Upon receiving prescribed signals from the memory means, the transducer is moved relative to the audio record to position it relative to a selected message related to the legible manifestation and visual display. Upon location of the selected message, the audio record is then moved relative to the transducer in order to provide an aural query or response.

The control record, upon insertion into the terminal by the student, has the direction and address data carried thereby transferred to the storage means. The direction data relates to programmed queries and responses related to the lesson subject matter and directed to probable queries or responses that might be made by the student. The address data relates the location of the image on the visual record, the message on the audio record, the input to the keyboard, the visual display, the legible manifestations, etc. to the student query or response.

The circuit means interconnects the various elements of the system so as to jointly or severally release direction data and address data from the memory means, for providing the required displays to a student's query or response.

Once the lesson material has been introduced into the system, the student can then present via the keyboard, a query to the system which will provide a response in the form of an image or an image and a message on the display means. The query presented by the student will appear on the display means as a legible manifestation, so that it is then possible to have the query and image and a message presented simultaneously to the student for his perusal. If the query necessitates a readout via the keyboard from the memory means, then such response also appears as a legible manifestation on the display means. As will be described more completely hereinafter, the system is also capable of presenting a query to the student which must then be answered by the student as a response via the keyboard. The query or response made by the student is automatically recorded on the control record in the portion thereof that follows the direction data and address data, after such data has been transferred to the storage means. In this way a complete record of the student's rate of accomplishment, correctness of response, time for making each response, etc., can be evaluated by the teacher upon completion of the lesson subject matter.

DESCRIPTION OF THE DRAWINGS

Reference is now made to the accompanying drawings wherein like reference numerals and characters designate like parts and wherein.

DESCRIPTION OF THE PREFERRED EMBODIMENT

Before describing any mode of operation of the system comprising the present invention, the specific elements of the system will first be described. Specific applications and/or patents are referred to hereinafter for a more complete disclosure of some elements.

General Description

Figure 1:
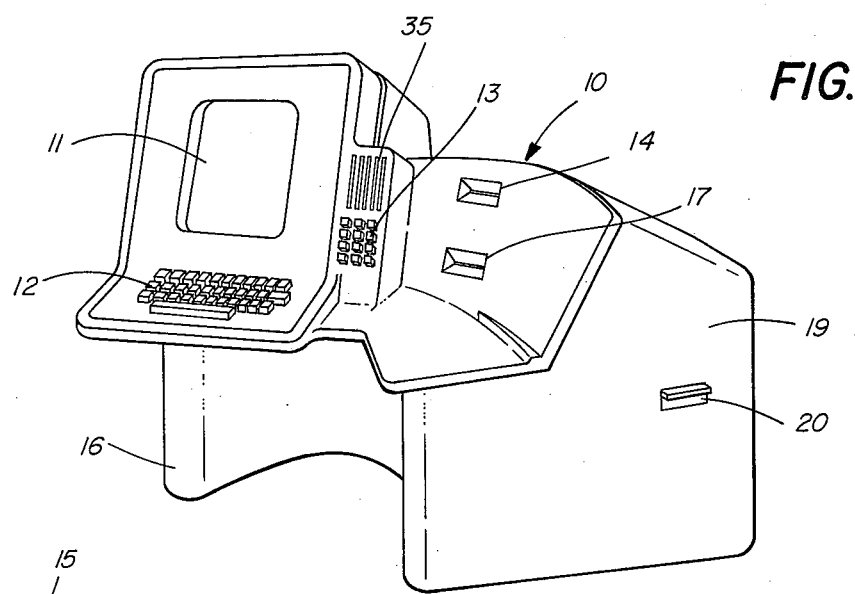
FIG. 1 is a perspective view of a terminal in the system showing the relation of the various elements to the position assumed by the student.

With particular reference to FIG. 1, the terminal, generally designated by the numeral 10, comprises the primary elements of the system with the exception of a computer per se, as designated broadly by the numeral 40. In terminal 10, a visual display means is designated by the numeral 11 and is arranged over and above a keyboard 12 that serves as a student-actuated input means. Another keyboard 13 is arranged to the right of the dispslay means 11, as viewed in FIG. 1, and can be used by the student as an input means to provide only numeric data. A slot 14 is arranged to the right of the display means 11 and keyboard 12 for receiving a visual record 15. The record 15 is inserted in slot 14 for introduction into and movement by a visual record actuating and handling means that is arranged completely within the cabinet designated by the numeral 16. Another slot 17 is arranged below slot 14 for receiving an audio record 18. In the side wall 19 of the cabinet 16 is a slot 20 into which a control record 21 is inserted.

Figure 2B:
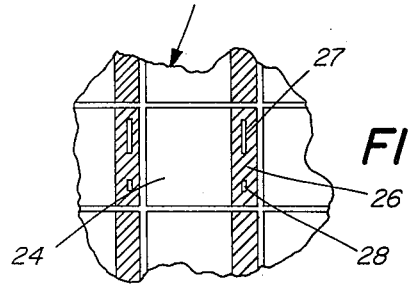
FIGS. 2a and 2b are plan views of a visual record in the form of a microfiche, the latter view being an enlarged detail view showing the framing marks arranged relative to each image area.
Figure 2A:
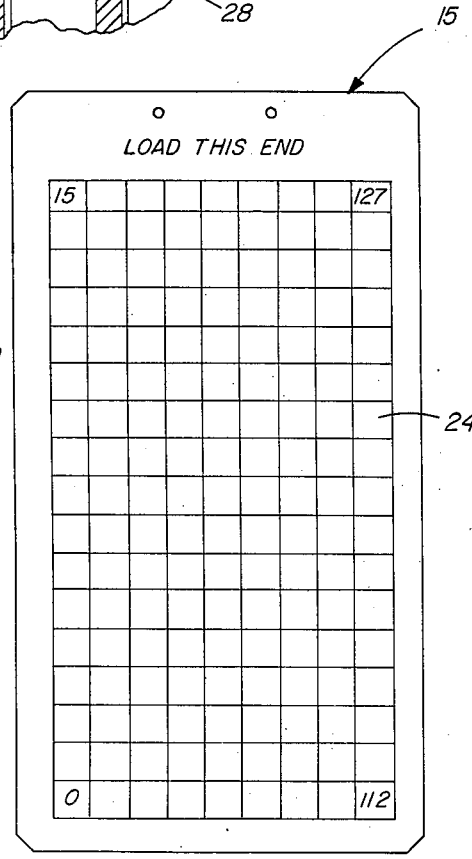

The visual or image record 15 comprises a photographic transparency or microfiche having an X-Y, 8×16 array of 128 image areas 24, see FIG. 2a. This image arrangement lends itself to the optimum rate at which any one image can be positioned in alignment with a projection optical system 25. Each of image areas 24, as shown in FIG. 2a, is provided with an opaque area 26 having a long fiducial mark 27 and a small fiducial mark 28, see FIG. 2b. The areas 27 and 28 are used to fine adjust the location of an image area 24 relative to the projection optical system 25. The random access selection mechanism by which an image 24 is positioned relative to the optical axis for projection provides means for accessing adjacent images in about 50 msec. or a maximum accessing time of about 300 msec. In any case, this means that the microfiche or visual record 15 can be positioned relative to the optical axis to display any image to the student in approximately the same length of time as it takes him to blink an eye. A response time of this magnitude eliminates any possibility of the student having time to drift away from the subject at hand while waiting for the next display or sound message.

Figure 3:
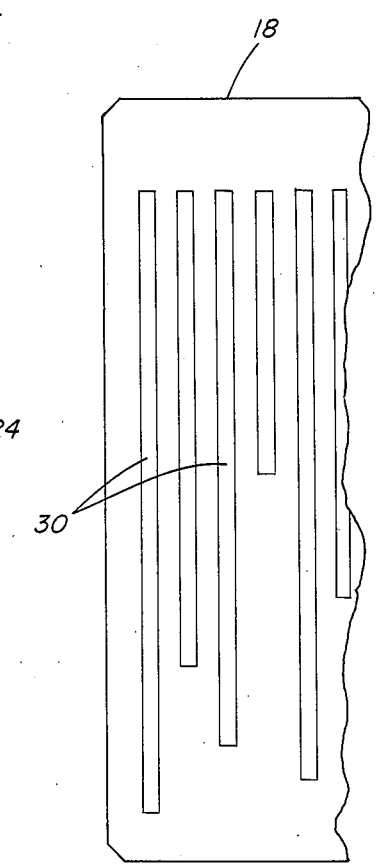
FIG. 3 is a partial plan view of an audio record as used in the present invention and showing the message tracks extending longitudinally of the carrier.
Figure 4:
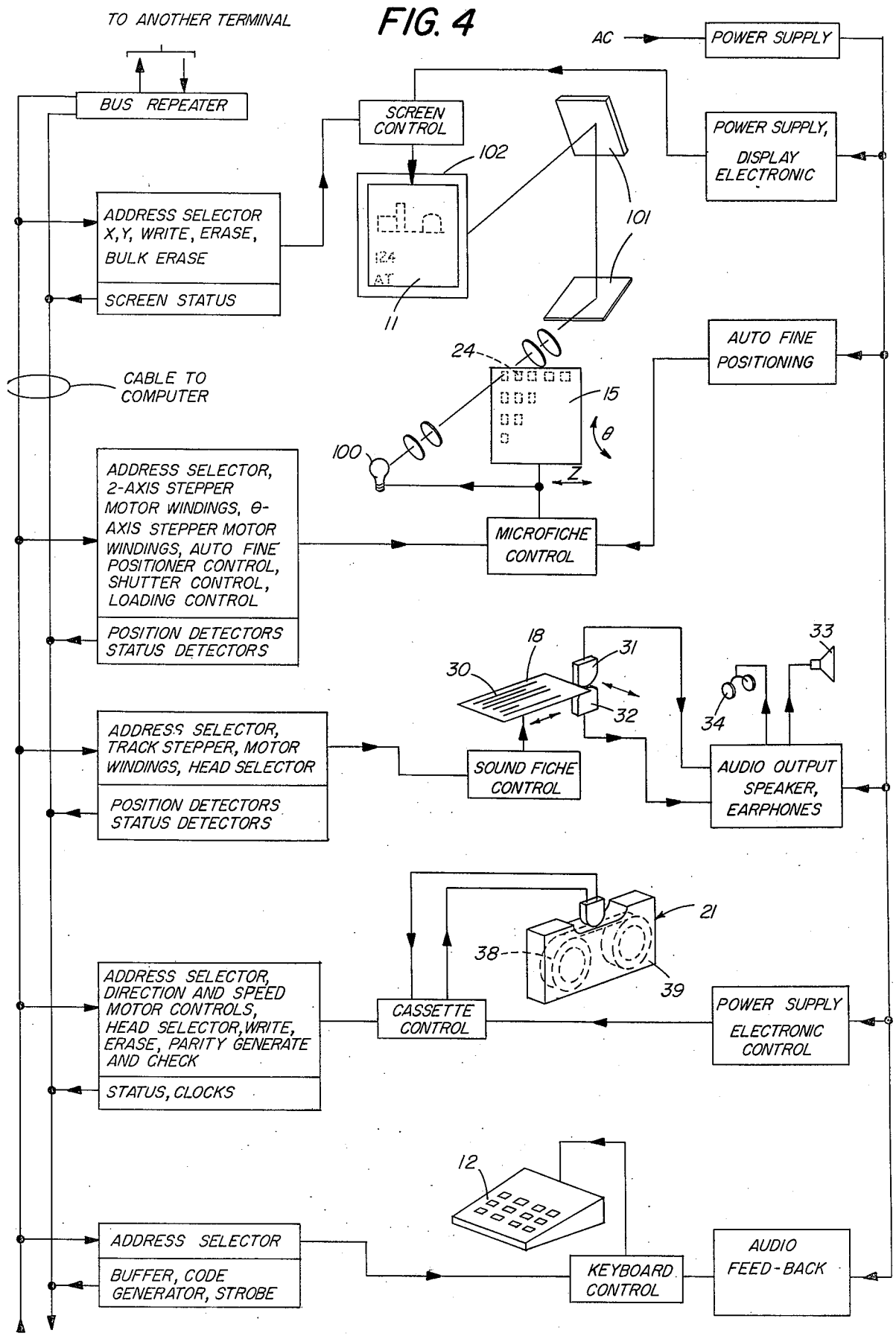
FIG. 4 is a schematic view showing the interconnection of the various elements comprising the terminal and the functions associated with various controls for each of the different elements.

The audio record 18, see FIG. 3, comprises a carrier of generally the same dimensions as the microfiche 15 and is coated on both sides with a layer of chromium dioxide material. Messages are recorded in spaced, parallel, linear tracks 30 extending longitudinally of the record, each track being capable of providing a maximum of 9 seconds of sound reproduction. A pair of sound transducers 31, 32 is mounted so the audio record 18 can be moved therebetween. The transducers are movable as a unit across the record 18 until positioned relative to a selected track 30. The transducers are then moved into engagement with the track and the transducer that is to reproduce is rendered operative with movement of the audio record. The track selection mechanism moves the transducers laterally to any one of 70 tracks thereby providing up to 140 messages. The terminal 10 includes a speaker 33 or can provide for earphones 34 for the sound message. The speaker 33 is arranged relative to a grill 35 in the front of the terminal 10. In normal use, the student can use a small earphone of the type used with a dictating machine.

The control record 21 comprises a tape 38 contained within a cassette 39. The tape 38 contains recorded direction data and address data in a format described more fully hereinafter, see FIG. 7. The mechanism into which the cassette 39 is introduced by the student via slot 20 provides for controlling movement of the tape, transferring the particular lesson subject matter to the computer and recording the student's queries and responses relative to time. The latter step of recording takes place after the direction and address data have been transferred to the computer and provides information for later evaluation by the teacher of the student's learning capability.

Display means 11 comprises a plasma display panel of the type disclosed in U.S. Pat. Nos. 3,601,531 and 3,601,532. The panel is formed by two separate pieces of plate glass between which thin conductors are arranged to divide the active or visual area of the glass into horizontal and vertical lines at 60 lines or points per inch. Each of these individual points (line intersections) can be made to glow brightly or to remain dark, the glow being a typical neon color.

In order to provide display means capable of a legible manifestation of data (alpha-numeric and/or graphic) as well as a projected image, a rear projection screen is arranged relative to the back panel of the plasma display panel. A photographic image projected onto the screen is then superimposed on the visual display and/or legible manifestation. Circuitry is associated with the plasma display panel for converting alpha-numeric information derived from the keyboard 12 into digital information for display on the plasma panel. the characters or lines are created on the screen point by point and are, therefore, individually and digitally addressable. The plasma points stay on or off without any need for further action or reactivation by additional signals. The wires in the panel only partially obscure transmitted light so it is sufficiently transparent for superimposed rear projection of an image. The structure and operation of such a screen is described in more detail in the above patents.

The selector-projector mechanism for locating one of the image areas 24 relative to the optical axis for projecting onto the rear of the plasma display panel and screen is disclosed in U.S. patent application, Ser. No. 150,697 filed June 9, 1971, in the name of E. Muka. The microfiche 15 is guided by the edges to form a path of movement in a θ direction. An arm moves the film in the θ direction to position the selected one of the 16 rows relative to the optical axis. At the same time, if need be, the entire microfiche casing translates or moves in the Z direction to position the selected one of the eight columns relative to the optical axis. Depending on the position of the image in alignment with the optical axis relative to the selected image, the movement can be only in θ direction, only in Z direction, or a vector sum of movements in both directions. Stepping motors control the Z and θ movements of the microfiche 15 relative to the optical axis for the projection system. Addressing signals for such movement are derived from the computer. The mechanism is positionable in a "homing" position for introduction and withdrawal of the visual record 15 by the student. When the microfiche 15 is inserted in slot 14, it is releasably engaged by an arm and drawn into cabinet 16. During subsequent θ movement, the microfiche 15 is moved past the slot 14 totally within the terminal until again positioned in the homing position. In this position, it will be moved through slot 14 for removal. Switches are provided to control the exact position of the microfiche and/or mechanism in the homing position in both the θ and Z directions.

The image is projected onto the rear projection screen on the back of the plasma display panel as described above. In order that the electronically generated plasma display (legible manifestation) can supplement the projected image, the latter must be accurately positioned so as to be in proper registry on the screen. For this reason, fiducial marks 27 and 28 are printed relative to each image area 24. When these marks are projected onto the screen they are intercepted by detectors which correct for any error in location relative to the θ and Z directions. During automatic fine positioning, once the Z position has been correctly ascertained, the θ position can also be established. The stepping motors associated with movements of the microfiche 15 in the θ and Z directions are controlled by the computer. A shutter mechanism associated with the projection system is also operated under control of the computer. The shutter is normally closed while the microfiche 24 is being translated from one position to another, thereby minimizing the blur that would be accompanied with such image movement.

The means for receiving and moving the audio record 18 is disclosed in detail in U.S. patent application, Ser. No. 150,698, filed June 7, 1971, in the names of John G. Streiffert and Edward Muka and entitled DEVICE FOR SELECTIVELY REPRODUCING SOUND ON ONE OF A PLURALITY OF TRACKS. As shown in FIG. 3, the audio record 18 comprises a sheet of material, for example, a plastic material or a metallic material, such as aluminum, having applied to each surface thereof a coating or stripes 30 of a material for magnetically recording sound, such as, chromium dioxide, ferric oxide, etc. The stripes 30 are arranged longitudinally relative to the length of the audio record and are in spaced, parallel relation approximately 0.75 mm apart and approximately 110 mm long to provide an audio message of about 9 seconds duration.

When the audio record 18 is inserted in slot 17, the leading end thereof is engaged by a mechanism which draws the audio record into the cabinet and into a homing position. Movement of the audio record is within cabinet 16 and under control of the computer to be described hereinafter. The mechanism by which the audio record 18 is moved comprises guides along which the record is moved between two balanced and opposed transducers 31, 32, one of the transducers being on each side of the record. The transducers 31, 32 are movable as a unit transversely relative to the record to position the transducers with respect to a selected one of the sound tracks 30. The transducer to be operative relative to the selected sound track is activated after the transducers have been moved into engagement with the audio record. The audio record is then moved relative to the transducers. A solenoid controls contact of the head with the record and switches are utilized to detect movement of the audio record into and out of the homing position, end of message, etc. A voice-operated switch detects the end of message on any track and initiates fly-back of the record into its homing position. The computer can then command the track to be next selected, movement of the transducers and movement of the audio record.

The digital tape cassette 39 is a commercially available unit which permits recording of both the lesson material and the student record. In the computer per se, a lesson file or module comprises the directions for ascertaining or providing a query or response and the address of the query or response relative to the visual and audio records. For this reason, each lesson file is uniquely associated with a related microfiche and audio record.

When the cassette 39 is inserted in the slot 20, the directions and addresses recorded on the tape are automatically transferred to the computer. When the end of the recorded material is reached, a signal is derived which stops further movement of the tape and, at this point, the tape remaining in the cassette is utilized to record the student's queries and responses as well as the timing of such. These recorded queries and responses and their related time are an indication to the author or teacher of the student's progress, of any further guiding or instruction that may be needed by the student, as well as any need to modify or change the lesson material in order to make the course more complete and more meaningful to the student.

Computer

Figure 5:
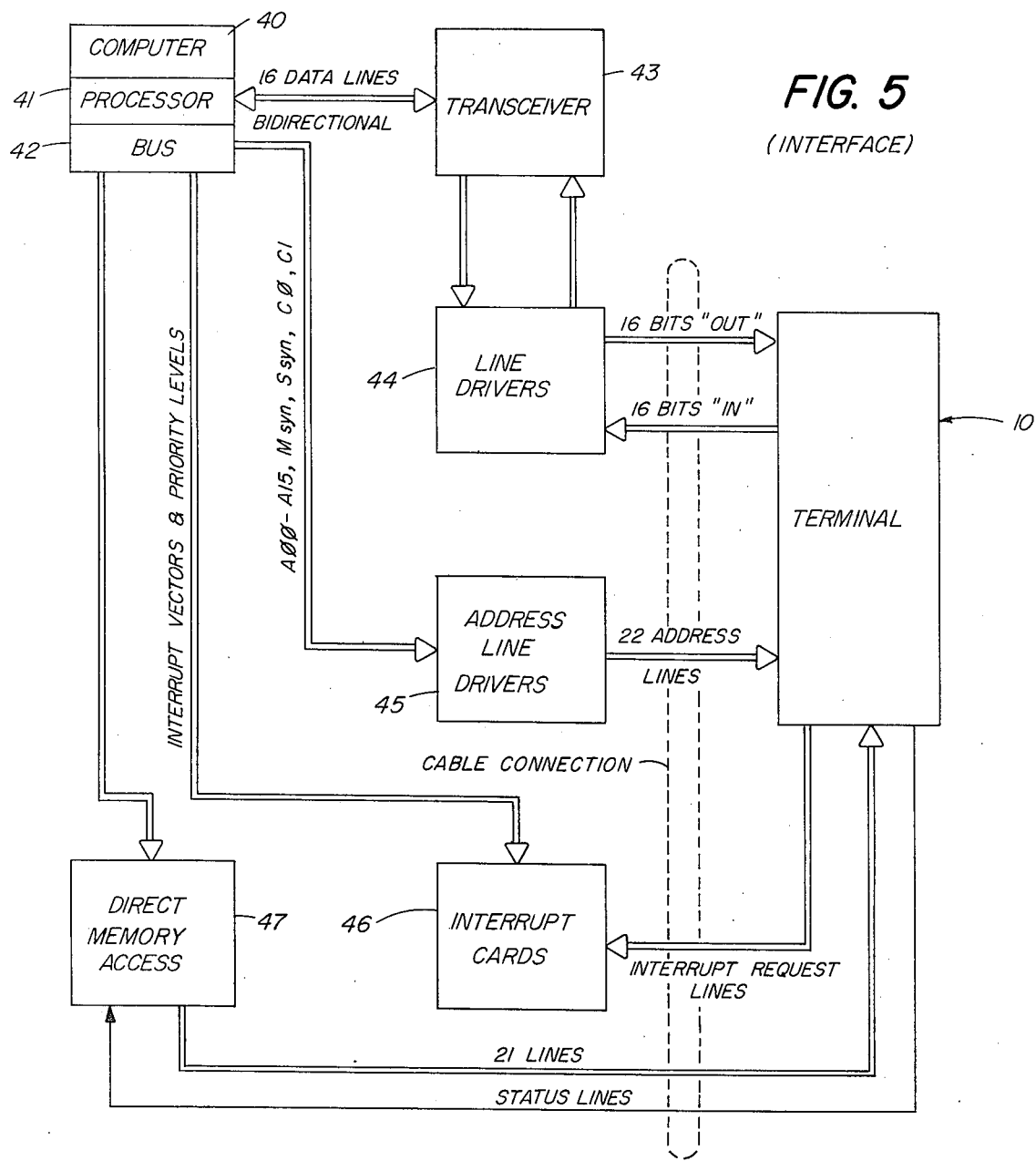
FIG. 5 is a general block diagram of the elements comprising the invention and showing the manner in which the various data lines are interconnected between the elements.

The computer designated by the numeral 40 in FIG. 5 can be a commercially available unit manufactured by the Digital Equipment Corporation and designated by model number PDP-11. In general, peripheral devices, such as teletype, paper tape, reader/punch, etc., operate in a similar manner to transfer information. They either require data from the computer or gather it from an external source to supply data to the computer. In either case, the computer samples the device's flags to determine what type of operation is required. A flag, as used throughout this description, is a signal, either as a data bit or an interrupt, which informs the computer as to the state of the device. For example, using the tape WRITE flag, the computer can determine that the tape system requires a new data word when it is in the WRITE mode.

With reference to FIG. 5, the computer 40 comprises a processor 41 and a bus 42. The computer 40 is connected to a transceiver circuit 43 by 16 bidirectional data lines. The transceiver circuit 43 connects the 16 data lines into 16 output lines and 16 input lines which are interconnected to the line driver circuit 44. The line driver circuit comprises a number of amplifier circuits to insure input signals to the terminal 10 and to the computer 40 that are uniform and of sufficient amplitude for operation. The 16 bits are then transferred to the terminal 10 and interconnected to the visual display means with control signals being interconnected to the optical projection system, sound reproducing system and keyboard as well. The 16-bit line serving as an output from the terminal 10 is also connected to the line driver circuit 44 for conversion into the 16 bidirectional data lines serving as inputs to the computer 40. The address line driver circuit 45 is also a group of amplifiers which interconnect suitable control signals to the terminal that are derived from the computer 40. The interrupt card circuit 46 interconnects signals establishing interrupt and priority levels between the computer 40 and the terminal 10. These latter signals are, for the most part, interconnected to the visual display 11 in the terminal and serve to interrupt computer operation for providing information or data of a high priority. A direct memory access circuit 47 is interconnected between the computer 40 and terminal 10 and is directly connected to the coordinate matrix for the visual display 11. The direct memory access is a circuit that while shown as a separate circuit in FIG. 6 can be readily incorporated in the function of the computer 40.

Direct Memory Access (DMA)

The direct memory access (DMA) 47 provides an X-Y data and write-erase control interface between the computer 40 and the terminal 10. With the direct memory access, interconnected to the terminal 10 as a separate device, the terminal has access to memory coordinate character data blocks, interrupting activity of processor 41 only when a new character or graphic data blocks are required. Since the visual display 11 (plasma display device) has a relatively slow writing rate, the computer 40 is free for background process control or computing activity while the visual display circuitry is accessing coordinates from memory.

Figure 6:
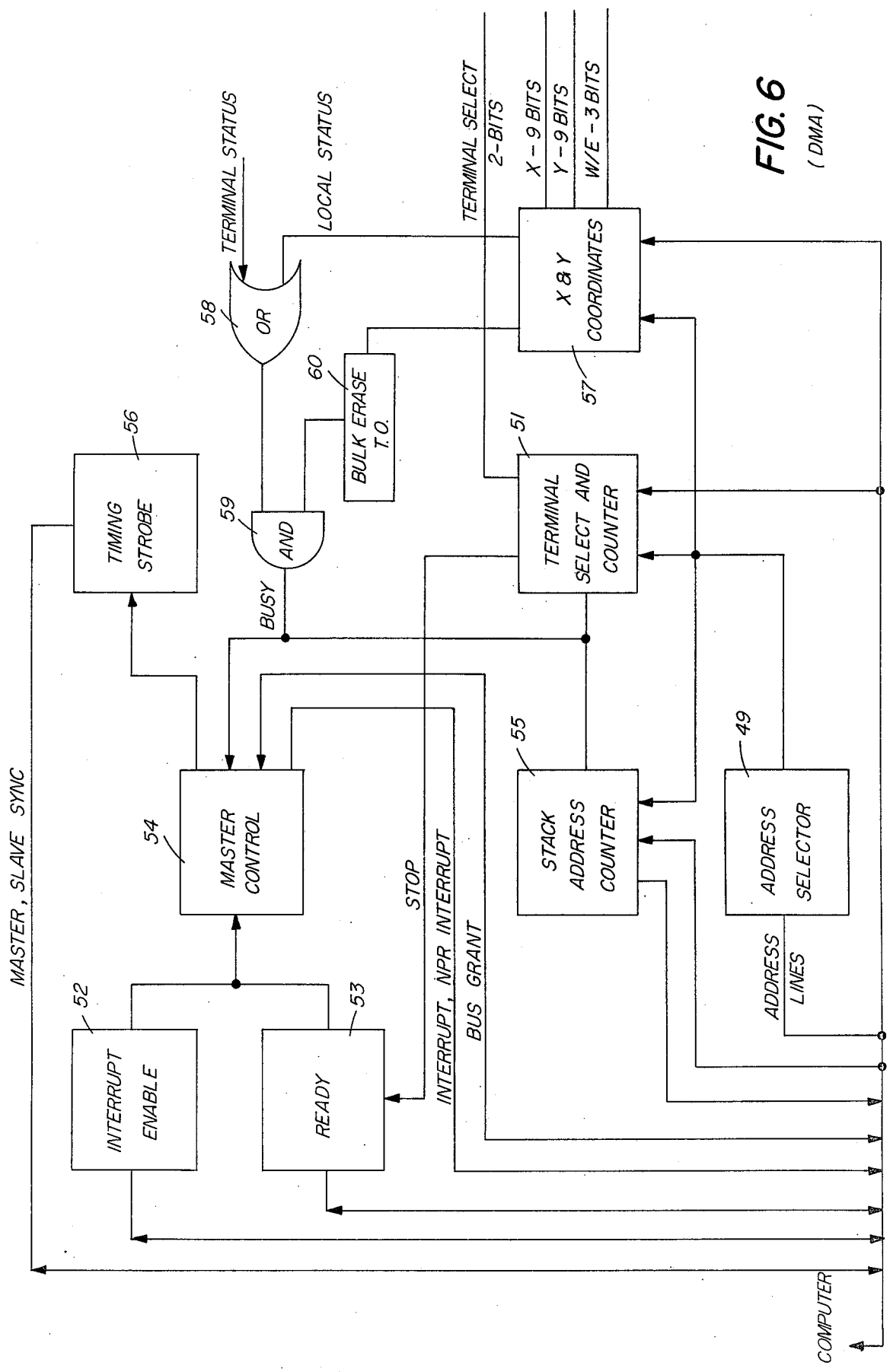
FIG. 6 is a detail block diagram of the direct memory access shown in FIG. 5.

The direct memory access 47, as shown in block diagram form in FIG. 6, is a device in which the data words assembled under program control and containing X or Y coordinate binary coding and write or erase control are loaded into memory in table form. Control words that contain memory table address, number of data words in memory stack, and terminal selection are sent to the direct memory access 47 through the bus 41 of computer 40 in response to a DMA READY signal. Non-processor interrupt memory retrieval is then commenced by the direct memory access and the processor 41 is released to service other device interrupts. The direct memory access retrieves the X and Y data, a word at a time, from the memory stack and strobes it to the terminal 10 in response to a terminal STATUS signal. The display means 11 accepts the data and writes or erases the designated point. When the last point coordinate data word has been extracted from memory, a process interrupt signal is generated. The next display to be serviced is determined by program control and the cycle is repeated.

First, with reference to FIG. 5, the computer 40 includes bus 42 which is a parallel data, transmission line linking the computer or processor 41 and memory with peripheral devices. It contains 16 bidirectional data lines, 18 unidirectional address lines and 22 bus grants, priority, sync and control lines. Data strobed to peripherals is steered by the address lines through an address selector, which decodes the address and gates the data to the appropriate peripheral device. Sync signals serve to request data from the peripheral devices or the computer and acknowledge when data is received. Data and addresses are received from the bus by the direct memory access; address location lines are decoded by the address selector which acknowledges receipt of data and strobes the data into the direct memory access data buffers.

The computer generates a data word and a data transfer address. The address selector 49 decodes the address. This enables the data to be transferred to the proper receiver, namely, the stack address counter 55, the terminal select and counter 51, or the X and Y coordinates buffer 57.

The stack address counter 55 is a 12-bit countdown binary counter that is preset by a counter word to the (n-1) number representing the total number of coordinate data words in the memory table. This counter is shown together with the terminal-select data buffer 51. Stack address counter 55 decreases each time the coordinate word is strobed to the display means 11. When the last word is strobed out, the stack address counter is then set at all O's and generates a borrow signal (STOP) which inhibits further non-processor requests and enables a READY flip-flop (not shown).

The terminal-select, 2-bit data buffer 51 is set by the counter word. The output lines from this counter go to the terminal 10 and are decoded and used to gate the write or erase function of the X-Y coordinates to the appropriate display. The interrupt-enable 52 is a clocked data buffer under program control and serves to enable or inhibit the direct memory access priority interrupt. In a normal operation, computer 40 sets the interrupt-enable when it is ready to service a visual display.

The set-output of the ready data buffer 53 is gated with interrupt-enable 52 output at the master control 54 to initiate a priority interrupt. Initially, the ready output is set enabling a priority output when the interrupt-enable is clocked. When the address of the first coordinate word is strobed into the stack address counter 55, the ready flip-flop is cleared and non-processor requests are initiated by the master control 54. When the last coordinate word is set, the ready is clocked to set by the STOP signal and a new priority interrupt is generated.

The stack-address counter 55 is a 16-bit implementing counter with preset inputs. The stack-address data word sets the counter to the address of the first coordinate data word in memory and is incremented for each successive word sent to the terminal display means. The counter output is strobed out through the computer when the master control 54 generates an NPR master signal. Since the X-Y coordinate data word takes 2 bites of memory, every other address location is required. Stack-address counter 55 thus ignores data bit 0.

The master control 54 generates a vector address for direct memory access priority interrupt, requests bus control for a non-processor data transmission, sets direct memory access but grant priority level and generates the MASTER signal which allows the direct memory access to control bus transmission during NPR mode.

The timing and strobe logic 56 consists of strobe delays, strobes and time-out error generator. The MASTER signal generates a delayed MSYN signal and strobes the output of the stack address counter 55 to the computer for transmission of the coordinate data word to the X-Y coordinate buffers 57. The MSYN delay is required to allow address data settling time. The computer acknowledges receipt of this stack-address counter data by generating an SSYN sync signal. If the computer fails to respond with a signal within a set time, a TIMEOUT ERROR signal resets the direct memory access and generates a new priority interrupt. A timing sequence is then initiated and after a set time, a STROBE signal is generated which strobes X-Y coordinate data into X-Y coordinate buffers 57. A second strobe is generated, DELAYED STROBE, which clears the MSYN signal, inhibits the NPR and releases the computer 40 until the display means is ready for another coordinate word.

The X-Y coordinate buffer 57 is a 21-bit clocked data buffer and output drivers. The X-Y coordinate input data word contains the 9-bit binary code for the X or Y point coordinate, an X and Y bit buffer loading, an erase and bulk erase bit for point or display erase, and a point bit which initiates the visual display write or erase process at the designated point. Since only 9 coordinate data bits can be loaded per data word from memory, two data words (X-Y pairs) are normally required for transmission to the terminal 10. A one-shot generates a LOCAL STATUS signal which initiates an NPR after the first X or Y data word is received. The next word received completes the X-Y coordinate, a data enable clocked buffer enables the WRITE, ERASE or BULK ERASE output data line and the terminal 10 operates on the designated coordinate. Upon completion of the WRITE or ERASE operation, the display means generates a STATUS signal which initiates a new non-processor request. If the BULK ERASE signal is set in the X-Y coordinate word, a time-out occurs which inhibits, as a display limitation, further non-processor requests for a set period of time. During the time when the display means is performing the WRITE or ERASE operation, no NPR signals are being generated and the computer ignores the direct memory access for serving one of the other peripheral devices. When an NPR signal is finally requested, only a few cycles are required to transmit the next X-Y data word, and the computer is again released. It is this "cycle-stealing" feature of the direct memory access operation which makes it attractive for a low data demand device, such as the plasma display means 11 on the terminal 10.

The OR circuit 58 allows a BUSY signal to be generated locally, that is, during transfer of the XY coordinate words or by the terminal 10, when a display has been activated by a data transfer. The terminal can accept BULK ERASE commands only at predetermined intervals. Accordingly, data transfer is inhibited by the AND circuit 59 and BULK ERASE T.O. circuit 60 when a BULK ERASE command is transferred. Data transfer can then be resumed after the predetermined interval.

Tape Format

Figure 7:
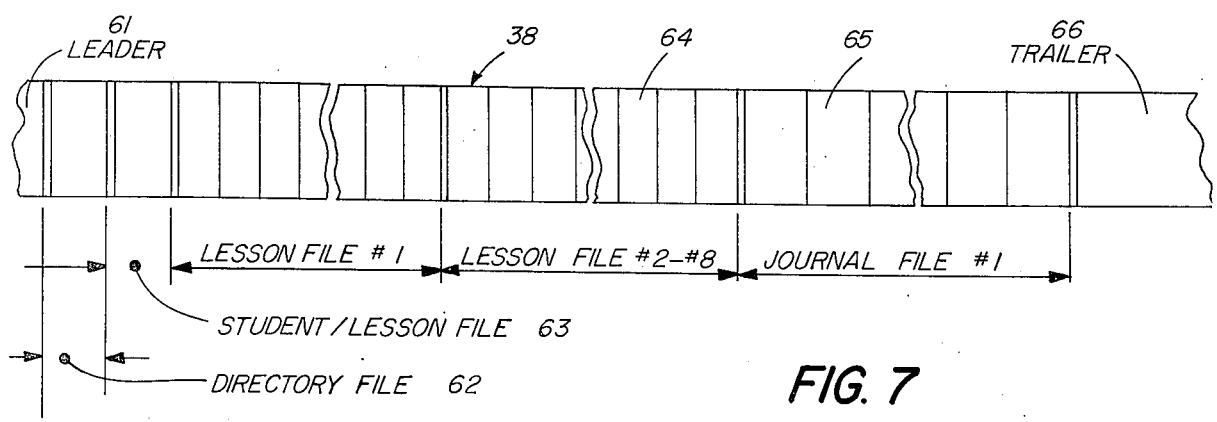
FIG. 7 is a detail view of the control record showing the relative arrangement of the direction and address data and various files thereon.

With reference to FIG. 7, a representation of a tape is shown disclosing the manner in which the tape is divided into various information or data sections. With reference to the left hand end of the tape 38, a transparent leader 61 is provided and adjacent thereto is a directory file section designated by the numeral 62. The directory file is a one block file consisting of a file header followed by up to 40 file fields. The directory file is a form of index used by the system to keep track of all of the files contained on a given tape. The purpose of the directory file 62 will become more apparent with the description which follows.

The student/lesson file 63 is also a form of directory file. It consists of a header record called a student record and is available as a collection of student lesson records. This record is utilized to maintain positional and scoring information, as well as switches and counters for lesson administration and a message or "blackboard" area for communication between the teacher and student.

The lesson file section 64 consists of up to eight lessons and the lessons are specified in the student/lesson file 63. A lesson is a highly structured collection of lesson lines used to give directions to either the student or the system. In practice these lesson lines, when being acted upon by the system, or when driving the system, are contained within a core memory. They are, however, far too numerous to be contained completely within this limited storage area. Lesson lines are, therefore, grouped into blocks and these blocks are maintained in disc storage. This latter area has a longer access time than core storage but is still sufficiently fast to be within the response requirements of the system.

Even though disc storage provides for more data storage than core storage, it is still not of such magnitude that it would be possible to store all lessons. Consequently, placing the lesson files on magnetic tape has proved to have many advantages. In the prescribed procedure for the system, the selected lesson data are transferred from the tape to disc storage. During the procedure as lesson lines are needed, the lesson blocks containing these lines are moved from disc to core storage. Adjacent the lesson file sections 64, there is a journal file section 65 which is a collection of keyboard entry records of the student's input via keyboard 12 during execution of the lesson. This information permits later playbacks of the chosen lesson. Whenever a keyboard entry is made, the keyboard information is stored in a keyboard record area. The first two words of this record area are used to contain the absolute time of the first keyboard character input. This information, after being acted upon in the execution of the lesson, is then placed in a tape output buffer. When the buffer is filled, it is written on a journal file and placed on the course tape. In this manner, all the information necessary for a rerun of a given lesson is available on the tape. The number of journal files on a tape will be dependent on the length of the tape and the number and length of the lesson files 64.

Tape Transport — Modes

There are two WRITE modes, a WRITE ADDRESS MODE, which allows information to be written on an address track of the tape 38 and a WRITE DATA MODE, which allows information to be written on the data track. Likewise, there is an ERASE ADDRESS and ERASE DATA MODE, the former disabling a phase encoder, producing a constant flux at the record head on the tape transport for writing interrecord gaps on the address track. The ERASE DATA MODE is substantially the same except that the interrecord gap is written on the data track. There is a READ ADDRESS MODE in which read information is stored on the address track and which also detects interrecord gaps when such are encountered. The READ DATA MODE reads information stored on the data track and also detects interrecord gaps. There is a READ ADDRESS-/NO IRG MODE which reads information on the address track and inhibits any interrecord gaps from causing an interrupt, whereas the READ DATA/NO IRG reads information on the data track and inhibits any interrecord gaps from causing an interrupt. The tape movement can be braked (BRAKE) while moving in either a forward or a reverse direction. Also, the tape can be rewound (FAST REVERSE) at a high speed or run forward (FAST FORWARD) at a high speed. In an IDLE MODE all voltages are removed from any source of energy supply and from the take-up motors.

Tape Transport — Flags

A tape flag word consists of 8 signals that show the status of the tape system. The flag system can be programmed on either of two modes, that is, interrupting or noninterrupting depending on the requirements. The computer 40 can be programmed so as to sample the read or write flags in a test mode with respect to the tape system. A flag word is presented to the computer as a data word. When the program addresses a flag word, it is moved as a data word into the computer for evaluation.

The various flag words are described with respect to their function hereinbelow. A WRITE flag indicates that the tape circuitry has phase encoded a data word and is ready for a new data word. The computer has a set period of time to respond to the WRITE flag request before tape circuitry will start encoding the buffer contents. The IRG flag is activated during the READ MODE indicating the beginning or end of a data block. The READ flag indicates that a data word from the tape transport has been phase decoded and stored in the tape-read buffer ready to be read into the computer. Again, the computer has a set time interval in which to respond before the next data word will overlay the old contents of the buffer. An EOT (END OF TAPE) flag is related to the digital tape cassette which has a clear portion at both ends of the tape and when the clear portion of the trailing end is reached, a photocell is activated signaling the end of the tape. The CHANGE TAPE ADDRESS (CHANGE T. A.) flag is initiated by light-to-dark transitions caused by chopper wheel vanes interrupting the light path between a lamp and a related photosensor. This flag is used to give an approximate indication of data block locations when the tape is in a high speed SEARCH MODE. The PARITY ERROR flag indicates a data word was read or written incorrectly. When this condition occurs, the data block should be re-read. A TAPE STOP flag is used to determine when the tape has reached a complete stop after a fast search operation. A CASSETTE IN PLACE flag indicates whether or not a cassette is positioned in the tape transport mechanism.

The flags of the tape system are divided into two types, namely, conditional and nonconditional. The three flags comprising the conditional group are the TAPE STOP, CASSETTE IN PLACE and EOT flags. These flags will be present or remain on as long as their condition exists. The non-conditional flags are: WRITE, READ, PARITY, IRG and CHANGE TA. These flags are reset by pulses from the computer.

Tape Transport — General

The operation of the system requires that the programming be carefully adherred to with respect to addressing, control, moving data and the use of flags. Each peripheral device used with the computer is treated as a memory location. Data can be moved to or from any device by performing this function in accordance with the computer requirements. The addressing structure requires priority levels, interrup vectors and address locations which are dictated by the requirements of the particular system. Other locations and vectors can be substituted to meet the particular needs of the system.

A data word consists of three parts. The start/stop bits, data bits and a parity bit. The complete word is 20 bits long with three bits for start-stop, 16 bits for data and 1 bit for parity.

The tape is controlled by moving a command word to the required memory location. When changing tape direction, adequate time must be allowed for the tape to come to a complete halt before a new command is given. The WRITE flag is used to time all write operations. The tape-write electronic circuitry moves data words from the tape-write buffer on the leading edge of the WRITE flag. This means that the first word of a data block must be preloaded into the tape write buffer while an ERASE DATA operation is being performed.

Transferring data words (16 data bits being considered as a word) to or from the tape system requires that the contents of the tape data location be moved to the desired core location or vice versa.

Tape Transport — Interface

Figure 8:
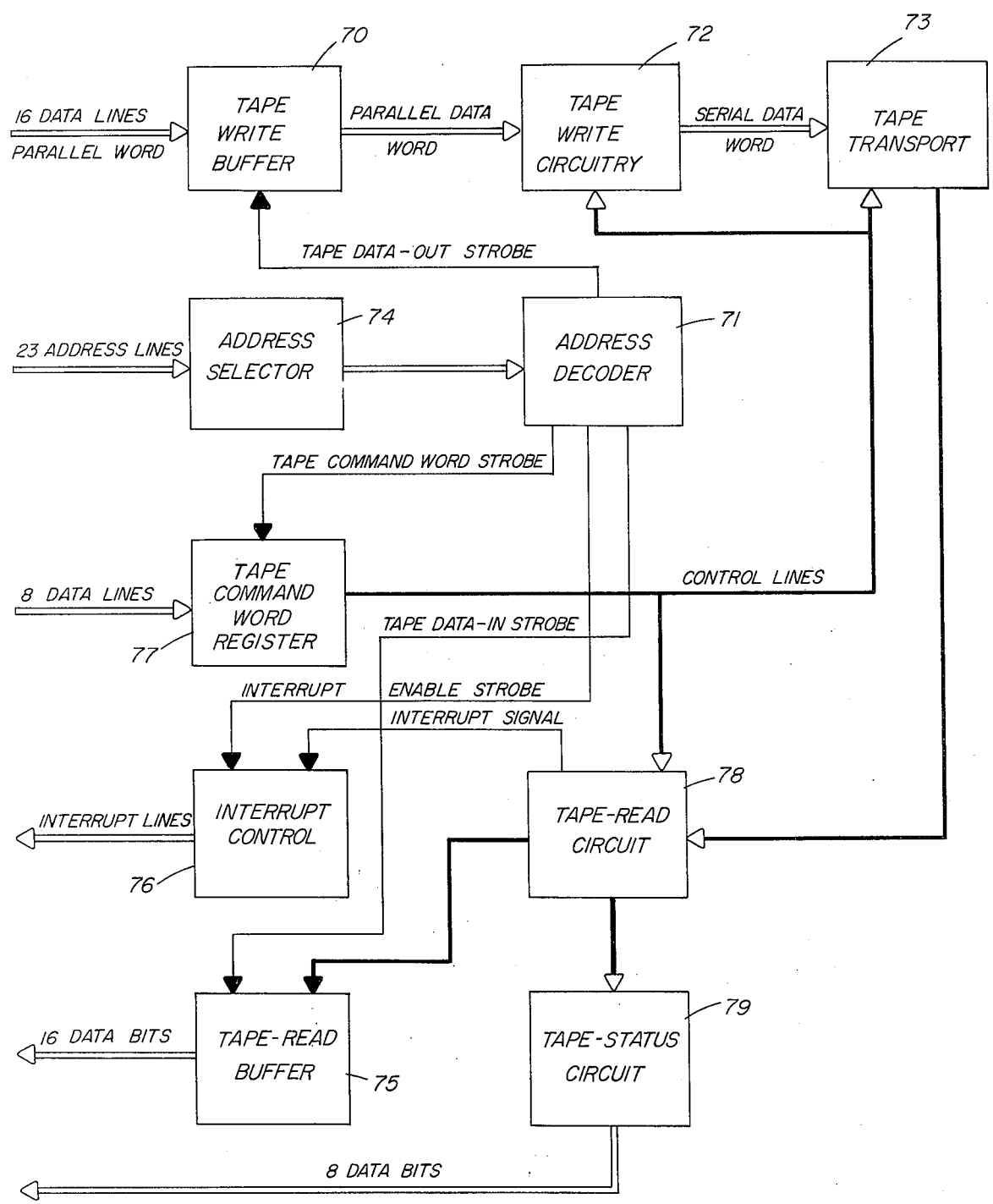
FIG. 8 is a block diagram of the circuitry for controlling the movement of the control record transport mechanism and of the direction and address data.

In FIG. 8, the circuitry associated with or interfaced to the tape transport, is disclosed in block form. During the WRITE cycle, data are sent from the computer as a 16-bit parallel word which is converted in the tape interface into a serial bit stream complete with a start bit, stop bit, parity bit and word gap and then transferred to the tape transport mechanism or device.

The tape-write buffer 70 receives the data bits of a word in parallel form and stores the words until triggered by the strobe pulses from the address decoder circuit 71. The words are released from buffer 70 in parallel for introduction into the tape-write circuit 72 and then as a serial data word to the tape transport 73 as described in more detail hereinafter.

The address decoder 71 is interconnected to address selector 74 which determines to which device the address signals from the computer 40 are to be directed. The decoding and writing of these signals is accomplished by the decoder 71. From FIG. 8 it will be evident that strobe signals control data-out with respect to tape-write buffer 70, data-in with respect to tape-read buffer 75, the direction of interrupt enable to interrupt control 76, and the direction of tape command word to word register 77.

The tape-read circuit 78 controls read out of data from the tape to buffer 75 and to computer 40. The tape status circuit 79 keeps the computer informed as to the operation being performed by the tape transport mechanism 73 and the associated circuitry 72, 78.

Tape Transport — Write

Figure 9:
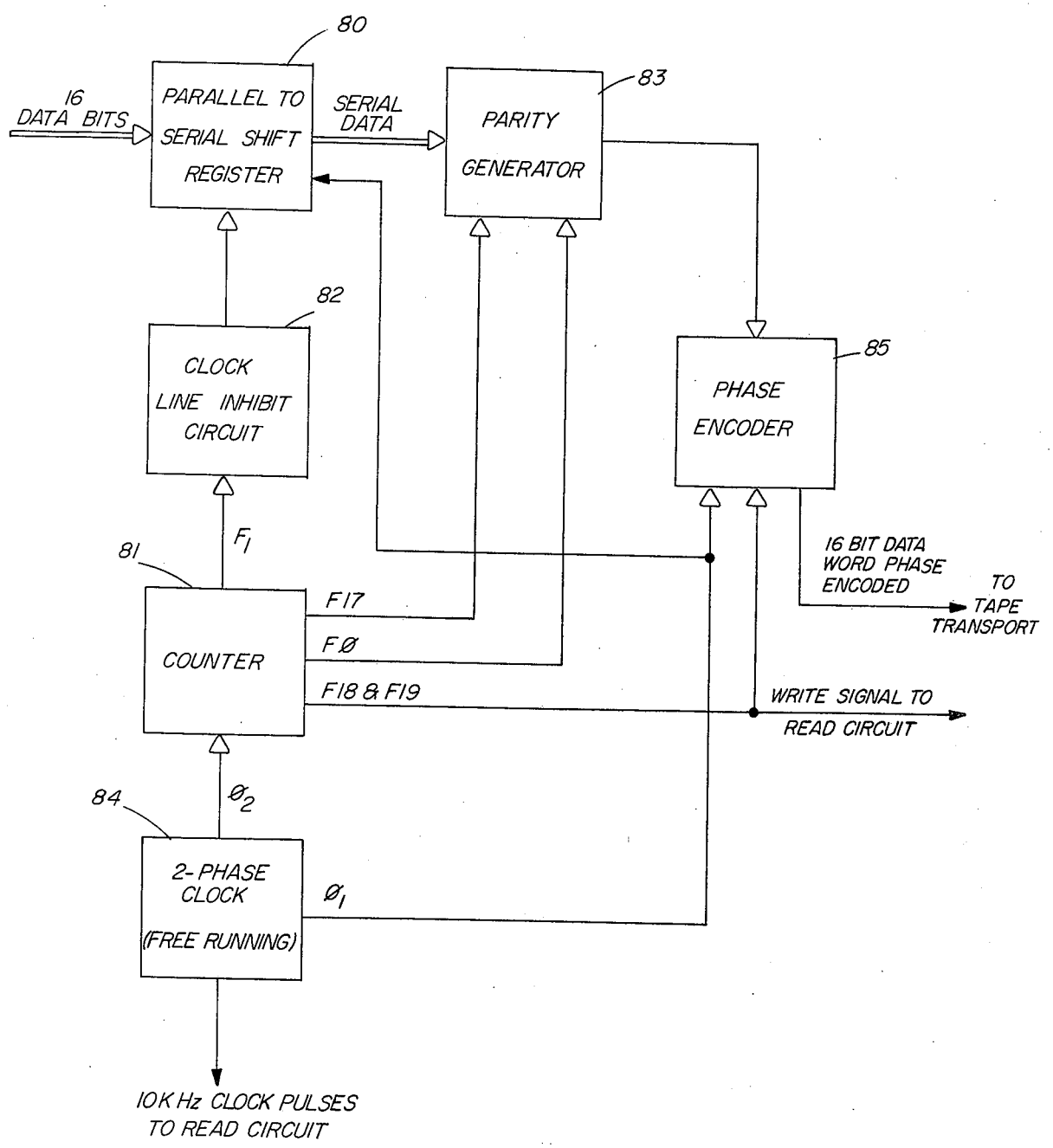
FIG. 9 is a detail block diagram of the READ circuitry for the control record transport mechanism.

Before a binary word can be recorded, it must be converted first from a parallel to a serial configuration and then phase encoded. A word is brought into a parallel/serial shift register 80 on the leading edge of a WRITE flag, see FIG. 9. The word remains stored until counter 81 reaches state F1 which causes the line from clock line inhibit circuit 82 to register 80 to go low. With this line low, clock pulses cause the word to shift out of the register 80 in serial form to parity generator 83. This will continue until all bits are released, the last coinciding with state 16 of the counter 81. During the next clock pulse F17, a parity bit is inserted into the serial word by generator 83 and the line to shift register 80 then goes high. Counter states F18 and F19 generate a word gap in the serial data stream and, at the same time, generate the WRITE flag. The leading edge of the WRITE flag loads a new data word into the shift register 80. State F20 resets the counter 81 causing it to go to state F0 which generates the start bit of the next word. The process continues until all the required data have been recorded on tape. The word gap and start bit in the bit stream, provide means of synchronizing data while in the playback process.

All timing is derived from a two phase, free running 10 KHz clock circuit 84 which provides 5 KHz per phase. At this clock frequency, the bit transfer rate is 5000 bits per second and the data bit density is 1000 bits per inch. The necessary timing operations of the WRITE circuitry is the function of the counter 81.

The parity generator 83 inserts a 1 or a 0 into the bit stream during state F17 of counter 81. Even parity generation, the technique used, requires each word to contain an even number of 1's. If the data word is already even, the parity generator inserts a 0 at time F17. If it is odd, then the generator inserts a 1. Serial data coming from the shift register 80 gate clock pulses to flip-flop circuit not shown. This flip-flop circuit controls the data output with the start bit and parity bit added thereto.

The phase encoder 85 eliminates the need for a pre-erased tape. This phase encoding or phase modulation utilizes a continuous writing current for binary input. A 1 is written, for example, by a positive change in writing current at data clock time, while a 0 is written by a negative change in saturation writing current. This coding procedure results in a positive read pulse for each recorded 1 and a negative read pulse for each 0. The advantage of using phase encoding is that it is self-clocking, thereby providing a clock pulse for each data bit during the playback process. The logic value of the phase encoder 85 is controlled by the 01 and 02 pulses.

Tape Transport — Read

Figure 10:
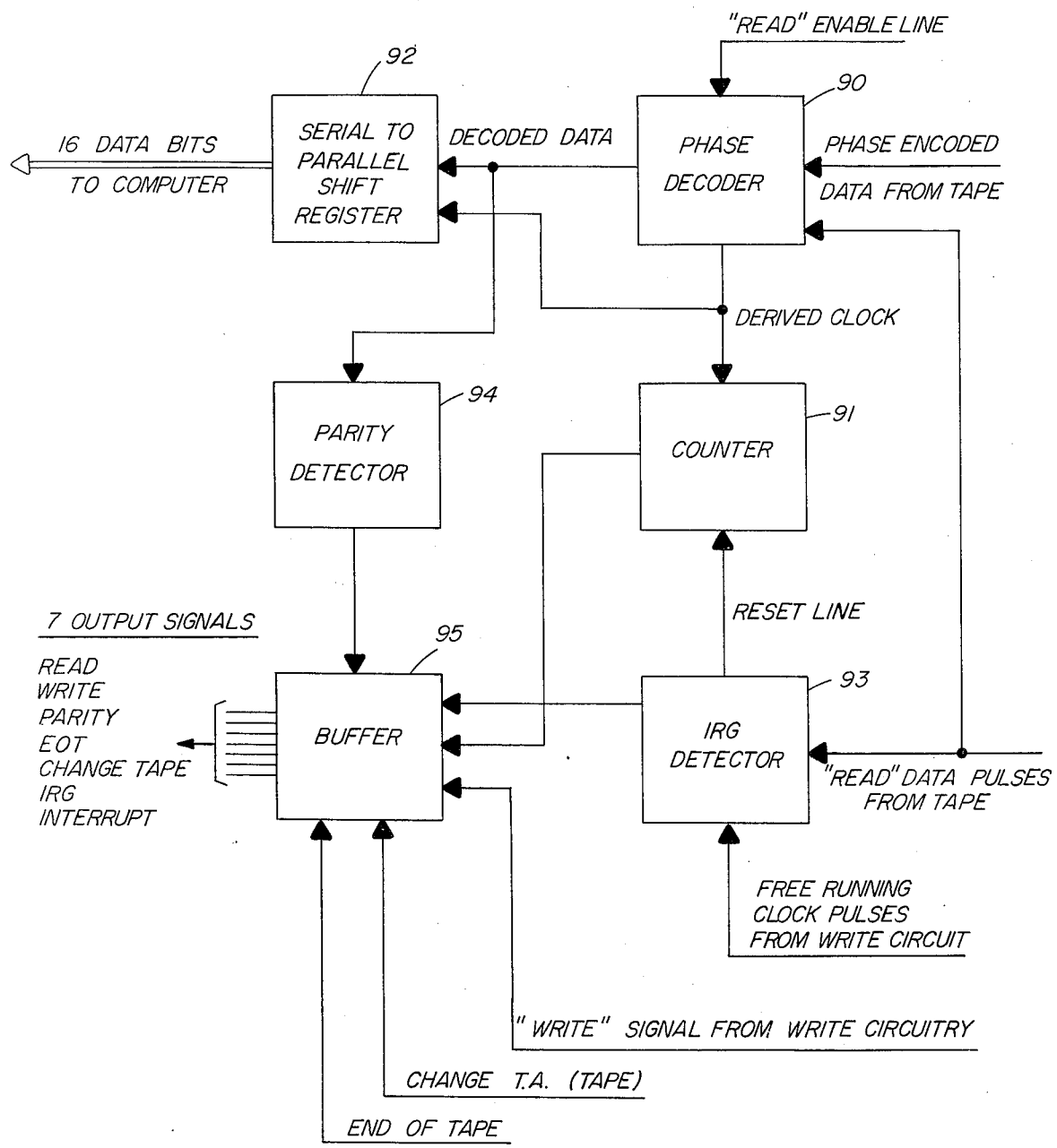
FIG. 10 is a detail block diagram of the WRITE circuitry for the control record transport mechanism.

The read circuity associated with the tape transport mechanism is disclosed in the block diagram in FIG. 10. When the system is in the READ mode, data from the tape unit is fed into the phase decoding circuit 90. The decoder derives from the tape signal the necessary clock pulses to synchronize all read operations. The decoder also restores words to their original condition, that is, before phase encoding. The derived clock pulses trigger the counter 91 to the various states required for parity detection and READ flag generation. The clock pulses also step the serial data stream into serial/parallel shift register 92 from which data is strobed out to the computer 40 by the leading edge of the READ flag. Inter-record gaps and word gaps are detected by the IRG detector 93. This latter circuit resets the counter 91 when a word gap is encountered, and it also signals when the tape is between record blocks (IRG region).

The tape transport provides two useful data outputs. One is the data from the tape and the other is a positive going pulse for every flux transition of the data-bit stream. These read-data pulses provide the clocking information necessary to convert the phase-encoded serial data word into the 16-bit parallel format required by the computer.

Since every serial word begins with the start bit, the negative-going transition of the start bit is used to initiate phase-decoder operation. When recording, it is insured that all data blocks begin with an IRG. Therefore, the first read-data pulse is generated by the start bit of the first data word in the block. This pulse triggers a one-shot multi-vibrator, not shown. The one-shot output is used to inhibit read-data pulses from re-triggering during the operative period. In so doing, the 01 clock pulses are filtered out and only 02 clock pulses are allowed to trigger the one-shot multi-vibrator. Therefore, are recreated from the incoming data. The derived clock pulse is then used to trigger a flip-flop (not shown) having inputs of the serial data from the tape transport. The result is a serial output that recreates the original word before any phase decoding operation.

The counter 91 utilizes the derived 02 clock pulses to step through its logic state. The two states of importance are state F2 and state F18. The counter is not self-resetting, however, the reset condition occurs when a word gap or an IRG is detected by the IRG detector circuit 93, thereby synchronizing the counter circuit with the incoming data. The first decoded output (F2) from the counter 91 starts the serial parallel conversion clocking sequence. The other counter output (F18) stops the serial/parallel sequence and generates a READ flag. The READ flag indicates to the computer that one data word has been decoded. The circuitry for the counter 91 is similar to that of counter 81 but the former has only two outputs.

The IRG detector circuit 93 performs two operations, namely, it resets the counter 91 when a word gap is detected, and informs the computer through an IRG flag when the tape head location is between data blocks. The circuit consists of a four-stage counter and two NAND gates to decode the desired states. Clock pulses from the counter 81 are utilized to provide the necessary clock pulses. Resetting is accomplished by the read-data pulses from the tape transport. A description of the read-data pulses was described hereinabove with respect to the operation sequence of the phase decoder 90. With data coming in, the read-data pulses continuously reset the counter 91 until a word gap is encountered. The word gap, devoid of read-data pulses, allows the counter 91 to step to a state 4 which generates a counter reset pulse. Incoming data will reset the IRG detector's counter to 0 which continues the process until the end of the data block is reached. When this occurs, the counter passes through state 4 resetting the counter 91 and continues to state 14 which generates the IRG flag. The IRG detector 93 will continuously generate IRG flags so long as the tape head is between data blocks.

The parity detector 94 might be more appropriately called a parity generator since a new parity bit is derived from the incoming data word and then compared to the parity bit coming in with the data. Operation of the parity detector 94 is exactly the same as the parity generator 83 described hereinabove. When the generator parity bit is compared with the incoming parity bit and the two bits are different, then a PARITY ERROR flag is generated.

After the incoming data word is phase decoded, the serial-bit stream is clocked into two 8-bit serial in parallel out shift registers designated by numeral 92. Synchronization is accomplished by two counter states F2 and F19. Clocking pulses are prevented from moving the serial bit stream until state F2 is reached. Once clock pulses are allowed to move data, they continue until state F18 is reached, disabling the clocking circuitry. A complete 16-bit data word is now resident in the shift register 92. It will remain there for a period of time after which the clocking cycle will be restarted and a new word brought in.

When state F18 is reached by the counter 91, a READ flag is generated moving the contents of the shift register to the tape data buffer 75. This buffer is used to hold a data word for a short period of time allowing the computer sufficient time to service the tape unit plus other devices requesting service. Flag controls are held in buffer 95.

Image Selector — Projector Mechanism

The system, as described above, utilizes a projection system in which the positioning of a selected image on the visual or film record with respect to the projection system is accomplished by a pair of stepping motors interconnected to a mechanism for moving the film in a $\theta$ and a Z direction. Once the image and its address has been selected and determined by the computer, the film record must be precisely positioned relative to the projection system for registry with the plasma display screen so as to be properly oriented with a superimposed plasma writing or graphics display. Using the pulse and DC characteristics of a stepping motor, the projection system employs a system of open and closed loop controls to the stepping motors for image or frame selection and fine positioning thereof. The projection system uses two stepping motors in conjunction with a cylindrical cage transport mechanism for the film record for providing the $\theta$ and Z direction movements.

Under computer control, the $\theta$ motor moves the film record or microfiche 15 through an arc determined by the film record dimensions and the radius of a cage, thereby selecting one of the 16 image or frame rows. The $\theta$ motor makes four steps per frame. The Z motor transports the microfiche and the cage in an axial direction, thereby, selecting one of the eight image or frame columns. The Z motor requires eight steps to move one frame. A low voltage, high intensity lamp 100 provides the light source for projection, a mirror system 101 relays the image from the projection station to a rear projection screen 102 mounted on the back surface of the plasma display means. The fiducial marks 27, 28 arranged relative to each image, are projected onto photosensors which feed any error signal back to the $\theta$ and Z motors for precision registration in either or both of the horizontal and vertical directions.

The sequence of operation for selection and fine positioning of an image or frame in the system is generally as follows: The computer 40, on the basis of a query or response presented by the student, determines the image next to be projected. On the basis of the address of the image last projected, the computer determines the number of steps required to move the newly selected film record in one or both of the $\theta$ and Z directions. The data-word appears at the computer interface in the form of four bits and a data strobe. The four bits are decoded by STEP DRIVE logic to select the appropriate $\theta$ and Z step or coil pair. The data strobe pulses enable a 5 msec stepping pulse and the selected coil pair are energized through coil drivers. The film record moves one step and rests until the next data-word command. When the desired image or frame is reached, the coils are in an energized state and the computer stops sending data. The STEP DRIVE logic enables fine-position amplifiers when the 5 msec stepping pulse is completed. A fine-position delay circuit allows mechanism movement to settle out and the $\theta$ and Z pulses to be turned off before error correction begins. Frame error sensors detect the fiducial marks 27, 28 at the projection screen 102 and send an error signal back to the fine position controller. The controller drives the coils through the linear amplifiers with unbalanced current causing the stepping motors to move in a direction to correct the error. This unbalanced current is maintained until a new error occurs from perhaps an accidential jarring or until the film record is stepped forward to a new image or frame position. In addition, the control electronics contain drivers that actuate a shutter during image frame selection and change, and solenoids for controlling film record load and unload operations. The drivers are responsive to data bits.

The film record transport mechanism permits a high stepping rate and rapid frame access with low friction and inertia. In addition, the film record load and unloading and frame selection is entirely under control of the computer. Random frame access time is less than one-third second for any one of the 128 image frames to be positioned relative to the optical axis of the projection system. Frame registration relative to the plasma display means is within two plasma display lines in any direction ($\pm$ 0.030 inch).

Audio Record Mechanism

The following general description relates to selection of a sound track on the audio record 18 as well as a cycle of operation. Such a cycle includes locating the related sound track, positioning the reading heads relative to the sound track, and then moving the heads into engagement with the selected track on the audio record. Further signals are then utilized to render operative the proper head and to release the audio record for movement past the heads, thereby reproducing the sound or message. At the end of any message, signals must also be provided to remove the heads from contact with the audio record and to return the audio record to an initial home position. The signals utilized in accomplishing the above steps are described hereinbelow.

A status word contains four bits of information to indicate the condition of the sound system. These conditions are: End of Message, Initialize Position, Proper Load, and End of Travel. A data word is also used and contains information to control the operation of the sound system. The data word is used simultaneously with two other control words, namely, SOUND OPERATE and RELEASE SOLENOID. The SOUND OPERATE strobe signal initiates movement of the audio record whereas the RELEASE SOLENOID strobe signal energizes the latching solenoid which releases the audio record from the loading position.

The following steps will be implemented during or upon a loading of an audio record 18 into slot 17. The audio signal should be disabled as a part of the system initialization process. The computer checks to see if the heads are in the "home" position, and, if not, steps the heads until the position flag is asserted indicating the heads are in the home position. The movement of the audio record holder is started by asserting the SOUND OPERATE strobe pulse. There is a period of time allowed after the SOUND OPERATE strobe pulse to permit the audio record holder to latch into the loading position. Once the student has placed the audio record in the holder and actuated the proper key on the keyboard 12, the computer checks for the PROPER LOAD flag. Assuming the audio record has been loaded properly, the RELEASE SOLENOID strobe pulse is released by the computer allowing the audio record to fall into the normal operating position.

For reproduction of a message, the audio disable signal maintains the reading heads inactive during the positioning of the heads relative to the selected track. After this has been accomplished, the SOUND OPERATE signal is provided and the audio disable bit is switched to an operating mode. At this time the sound circuitry control, keeping the drive solenoid energized until the end of message (EOM) is detected by a voice-activated switch. If the EOM does not release the solenoid, the audio record will continue to move until the end of travel (EOT) switch is reached. The EOT switch will then release the drive solenoid and activate the end of travel bit in the status word. With the drive solenoid released, the end of message (EOM) flag is activated as the record returns to its original position, and at this point the AUDIO DISABLE is activated. The sound system is now ready to play back another message.

During the unloading sequence, the heads are moved to the home position just as in the loading sequence. The SOUND OPERATE strobe pulse energizes the sound drive solenoid, thereby moving the audio record up to the latching solenoid. The latching solenoid holds the audio record in place and also sends a pulse to the reproducing circuit to disengage the drive solenoid. At this point, the audio record can be withdrawn from the slot 17.

General Operation

When a student arrives at the terminal 10, he will have a course packet consisting of a film record 15, an audio record 18, and a tape cassette 21. The first implementation will be to press a designated key on keyboard 12 which will activate the system and which will then instruct him to load the film record, audio record and tape cassette. At this point, the student will be requested to enter via keyboard 12 his social security number, if he is a student, or, if he is an instructor or programmer who wishes to execute course material, a predesignated number. In the latter case, the information is recorded in the directory file section 62. In both cases, this information is also presented as a legible manifestation on display panel 11.

The system will then check to determine whether this is the first time this student has used this particular course tape cassette. This check is accomplished by inspecting the social security number field in student/lesson file 63 maintained on the tape 38, see FIG. 7. If it is the first time, the student will be asked for his name and student number if one has been assigned. This information, student name, social security number, and student number are then used to update the course tape by recording this information in file section 63. It is then personalized for the student's use.

If it is not a first time use for the course tape, the social security number entered is checked against the social security number stored in the student/lesson file 63. If there is an equal comparison, the user is asked for his name. An equal between the name input by the user and the name stored in the student/lesson file will pass the user or student onto the lesson selection procedure. The system will then be assured that the course tape belongs to this particular student. A non-equal check on either social security number or student name, will automatically cycle the student to a log-off procedure. The system will not allow a casual user to run with some other student's course tape.

In the lesson selection procedure, the check is made of all lessons stored on the tape to be used by the student. There is from one to eight lessons available on a course tape. If there are no restrictions as to lesson use or presentation, then the list of lesson names of all lessons on the course tape are presented to the student, with a request that he select one of them for execution. There may be restrictions in lesson usage. For example, certain courses may be marked "execute first". In such a case, only one lesson name will be offered to the user. He would either input the name of the only course offered or curtail the entire lesson by imputting the word "DONE". Certain lessons can also be restricted to a one time usage. In such a case, the name will be dropped from the list of available lessons after it has been used once by the student. As noted, the student must either input the name of one of the available lessons or commence a log-off procedure by imputting the word "DONE".

If the student inputs the name of an available course, the lesson file for the selected course is initiated in core storage and the system will call the lesson "preparation procedure". In the lesson preparation procedure, any messages left for the student in the selected lesson file will be displayed on panel 11. The selected lesson is read from the tape 38 and placed in disc storage, the first block of the given lesson is read into the core storage. The lesson unit table (a table of direct access location used in lesson execution procedure) is extracted from this lesson block and placed into its proper storage position. The first lesson line to be executed is then moved to lesson line processing buffer and the system then passes on to the lesson execution procedure. During the execution of the lesson, each query or response input by the student via keyboard 12 is recorded along with a time at which the input was made in a journal file 65 which is maintained on the course tape 38. Upon completion of the execution procedure, the student's correct and incorrect scores and any messages he may wish to leave for the teacher will be used to update the lesson record which, in turn, is used to update the student/lesson file on the course tape. The procedure then reverts to the lesson selection procedure.

The student will be permitted to abort the procedure just described at any time by the input of an escape character (ESC) followed by GO. If this procedure is followed, the existing scores and location within the lesson will be saved in the student/lesson file and the user will be sent directly to the log-off procedure. On returning, the user will usually be forced to complete this lesson from the point at which he cut off before starting the execution of any other lesson.

Figure 11:
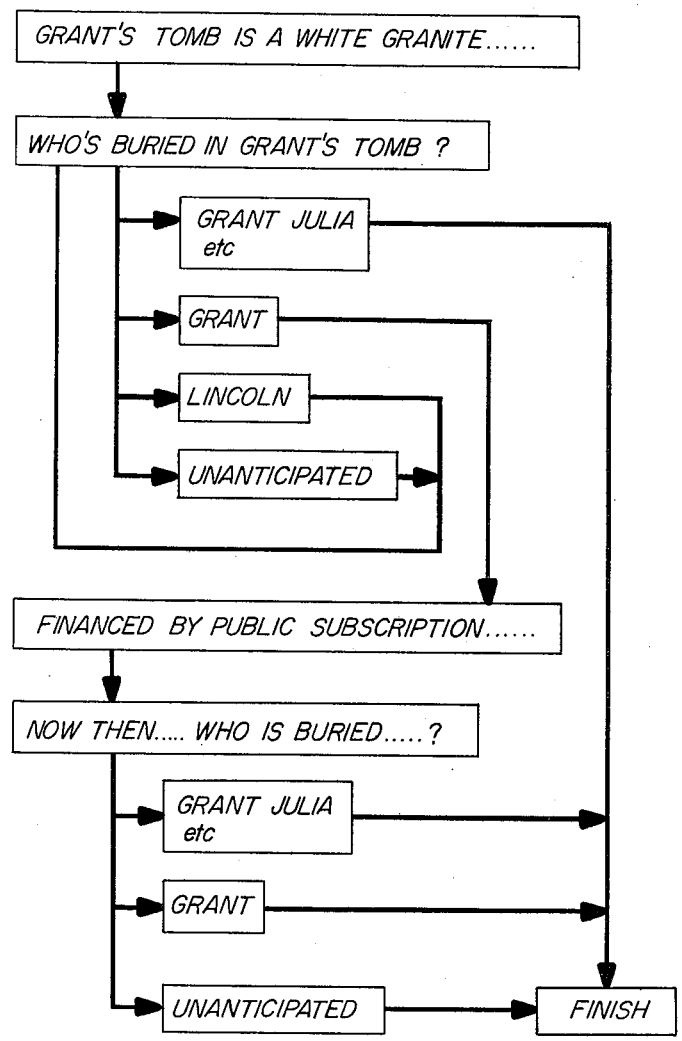
FIG. 11 is a block diagram of a simple lesson showing the branching of the subject matter in relation to the student's response.

In order to set forth an example of the way in which the system can be utilized, a short lesson is described hereinbelow without reference to all the controls, signals, etc. that might be required. Assume that a student has brought to the terminal 10 a film record 15, an audio record 18 and a cassette 21. After each of these has been inserted into its respective slot in the terminal, the student then initiates the system by actuating a particular key on the keyboard 12. When this is done, the computer automatically wipes any legible manifestation from the display panel and checks the relative positions of the film record 15 and audio record 18 relative to their home position so that the film record can be drawn into the terminal and the audio record is brought into the latched position. The student is then requested to enter his social security number and other data into the computer via the keyboard, as described above. This material or information is checked by the computer and, if necessary, entered into the student-/lesson file 63 on the tape 38. When this has been completed, the student is then requested by the computer 40 via the display means 11 to make a lesson selection and to enter such selection via the keyboard 12. In this case, the name of the lesson is Tomb, see FIG. 11. This word is typed by the student and entered from the keyboard via the display means and the computer to initiate entry of the subject lesson material on the tape 38 in one of the lesson files 64 into the memory for the computer. When this is accomplished, a suitable signal is generated. On the basis of the selected lesson material, an image area 24 on the film record 15 and an audio message 30 on the audio record 18 are moved into a position in the projection system 25 and relative to the reproducing heads 31, 32, as described hereinabove. The following statement then appears on the display means 11: GRANT'S TOMB IS A WHITE GRANITE MAUSOLEUM LOCATED ON RIVERSIDE DRIVE BETWEEN 122ND AND 124TH STREET IN NEW YORK CITY.

At this time, there also appears on the display means 11, a picture of Grant's Tomb which is superimposed on the above statement describing Grant's Tomb and its location. The statement will also be transmitted to the student via the sound track 30 on the audio record 18. During lesson development, the system can make queries of the author, for example: Should the computer furnish comments, such as right or wrong? To this, the author can reply yes or no. Such a query and its response will determine when a line or branch of the lesson material will occur relative to the student's progress. By the same token, the programmer or teacher can enter into the system an opportunity for the student to present one or more responses in an attempt to obtain the correct answer. In other words, the system can respond that the response was incorrect and the student can then make another response in an attempt to provide a correct answer. This, of course, will depend on the format decided upon by the author.

The query is now posed by the system to the student: WHO IS BURIED IN GRANT'S TOMB? Again, this text appears on the display means as well as an audio message. The answer to the question is typed into the system by the student and again appears on the display means as well. If the student's entry has included GRANT JULIA, GRANT MRS., GRANTS, or just simply GRANT, those that are correct, or will be accepted as correct, will be determined by the answers set up in the lesson program as being acceptable. Assume that any one of the first three can be considered as a proper and correct response and the latter as either wrong or an incomplete response. A correct response leads to FINISH, indicating the lesson has been completed. With an incomplete response, a branch can be made to a statement which is again presented to the student as an audio message as well as on the display means. This statement is "FINANCED BY POPULAR SUBSCRIPTION AND DEDICATED BY PRESIDENT MCKINLEY IN 1897, THE TOMB HOLDS THE REMAINS OF ULYSSES SIMPSON GRANT AND HIS WIFE, JULIA DENT GRANT." A restatement of the query is again presented. At this point, of course, the lesson would be completed with a correct response. Any response is final and the system then provides an indication on the display means 11 of FINISH indicating that the lesson has been completed. If the student gives a wrong or incomplete answer or response to the first query such as, LINCOLN, then the question is repeated "WHO IS BURIED IN GRANT'S TOMB?" The student's responses will then be treated as already described.

It should be evident from the description hereinabove, that the system encompassed by the disclosure is one which lends itself to many variations and modifications in accordance with the particular program to which it may be oriented. With the student able to respond via a keyboard so as to submit either a query or a response, the lesson material can be extended in many directions and, at the same time, be directed to only pertinent lesson material. The system has been found to be very useful in the training of servicemen, particularly since various and different pictures of the appliance or machine on which the serviceman is expected to work can be presented as a visual image and, at the same time, this visual record can be combined with an aural message as well as a legible manifestation of a question, a fact, an instruction, etc. Hence, the system is not limited to any particular subject matter, but can be as simple as described above, or as complex as required in accordance with the subject matter and individual's learning ability.

Also, with respect to the system per se, the description hereinabove has not been directed to any specific description of operation because of its inherent complexity. Instead, the description has been generally related and those skilled in the art will realize that the system per se presents many facets, each of which can vary in complexity as well as in the manner of presentation. It is to be understood that the computer referred to in the present disclosure is not of the largest storage capacity because the system is one which is believed to be particularly adapted to a limited number of terminals. Hence, the memory and storage capacity of the computer is somewhat limited. Also, where part of the storage means is not a direct part of the computer per se, it could be made a part thereof if a computer of larger capacity were used. Hence, the capability of the system is not to be considered as being limited in accordance with the above description. If at all, the above description provides a basis for expanding the system to any degree that might be necessary, as will be apparent to those skilled in the art. It should also be understood that the various interfacing devices can be part of the computer, the terminal or divided between them as the system might require. With the size of computers shrinking because of the technology advance in miniature and subminiature circuitry and in digital storage devices, a computer could be made a part of the terminal per se. As such, each terminal would stand alone with no need for relying on a computer common to a number of terminals nor the necessary interfacing circuitry.

This invention has been described in detail with particular reference to preferred embodiments thereof, but it will be understood that variations and modifications can be effected within the spirit and scope of the invention.

We claim:

1. A student controlled, interacting audio-visual learning device for manifesting lesson subject matter in response to presented queries and responses, the lesson subject matter comprising a number of distinct records separately introducible into the device and including a visual record having a number of addressed images, an audio record having a number of addressed message tracks and a control record having recorded program and address data for selecting at least one of the images and of the message tracks as related to a presented query or response, the combination comprising:

a data center having storage means and memory means and in which programming information data and address data related to the lesson subject matter are introduced into the storage means and subsequently released in accordance with the presented query or response;

a display terminal comprising student--actuated input means, visual display means comprising a gaseous discharge panel connected to the input means and the date center and a transmission type screen axially aligned in spaced relation with the panel for jointly or severally displaying a legible manifestation on the panel and a selected one of the addressed images on the screen, and respective stations for receiving each of the records;

the input means being interconnected to the data center and to the visual display means and including means for converting alpha-numeric and graphic information into input data for acceptance by the data center and for reproducing the information on the panel as the legible manifestation;

the station receiving the visual record including a projection system and means responsive to released address data from the data center for locating a correspondingly addressed image in the system for projecting the image onto the screen in superposed relation to any legible manifestation on the panel;

the station receiving the audio recording including transducer means and means responsive to released address data from the data center for locating a correspondingly addressed message track relative to the transducer means and for moving the audio record to reporduce the message as an aural query or response related to at least one of the reproduced information and of the projected image on the visual display means; and the station receiving the control record including transducer means interconnected to the storage means and memory means for reading and transmitting the recorded program and address data to the data center;

means responsive to some portion of the query or response presented via the input means for transferring from the storgae means to the memory means the address of at least one of the addressed images, the address of one of the addressed message tracks and program data for providing a legible manifestation on the panel related to the presented query or response; and circuit means interconnecting each of the storage means, the memory means, the visual display means, the image locating means and the track locating means and responsive to a control signal generated by the input means, upon completion of the query or response, for jointly or severally transferring and subsequently releasing the program and address data related to the presented query or response from the storage means to the memory means, the released program data initiating the converting means to provide the legible manifestation of the query or response on the panel and the released address data initiating at least one of the locating means to position the addressed image related to the query or response in the projection system to provide a visual image on the screen that is superposed on any legible manifestation and the locating and moving means to position the addressed message track related to the query or response relative to the transducer to provide an audio presentation.

2. A student controlled, interacting audio-visual learning device in accordance with claim 1 wherein the control record is a magnetic member on which the program and address data are recorded in digital form including means responsive to the memory means and the input means for recording each presented query or response and legible manifestation on the magnetic member following the program and address data and after transmission thereof to the data center.

3. A student controlled, interacting audio-visual learning device in accordance with claim 2 wherein the recording means for the control record includes control means interconnected to the storage means and the input means for transferring the program and address data on the control record to the storage means and to the memory means for recording on the control record, after such transfer, the program and address data released thereto by the input means and memory means.

4. A student controlled, interacting audio-visual learning device in accordance with claim 3 wherein the control record comprises a first section in which the program and address data are recorded and a second section in which the queries and responses that are presented by the input means or are generated by the program data related to the presented query or response are recorded, after transfer of the program and address data to the storage means.

5. A student controlled, interacting audio-visual learning device in accordance with claim 4 including means interconnected to the recording means for the control record for recording timing marks synchronized with the recording in the second section of the presented or generated query or response for providing a time relationship therebetween.

6. A student controlled, interacting audio-visual learning device in accordance with claim 1 wherein the circuit means includes a control circuit for establishing the readiness of each of the storage means, memory means, visual display means, visual record and audio record prior to each presentation of a query or response via the input means.

* * * * *